United States Patent Office 3,089,874
Patented May 14, 1963

3,089,874
STEROID LACTONES
Paul Kurath, Waukegan, and John Wayne Cole, Deerfield, Ill., assignors to Abbott Laboratories, North Chicago, Ill., a corporation of Illinois
No Drawing. Filed May 31, 1961, Ser. No. 113,610
12 Claims. (Cl. 260—239.57)

The present invention relates to a new group of steroids. More particularly, it relates to a new series of steroid lactones of the estrane series, a new group of intermediates necessary for the preparation of these estrane steroids, and a number of new processes which will produce these estranes.

According to the present invention, steroid lactones of the Formula I are provided.

I
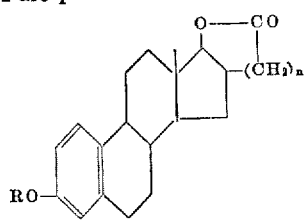

wherein R stands for hydrogen or methyl, and wherein $n$ is an integer from 1 to 3 inclusive. To those skilled in the art the above Formula I will suggest the compounds of Formula II, II
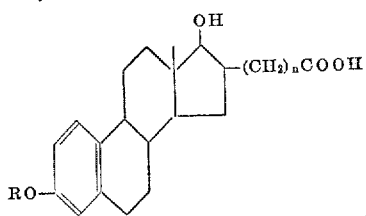

which are in equilibrium with the lactones of Formula I. These equilibriums can be influenced in known manner. The lactones of these structures have valuable hormonal activities. In particular, they show anti-androgenic activity with secondary effects on muscle growth and weight gain. The new lactones which are the main subject of this invention are also generally useful as endocrine agents.

The present invention is also directed to new steroid intermediates, useful in the manufacture of the steroid lactones of Formula I. These new intermediates belong to the class represented by Formula III III
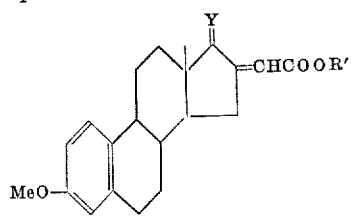

wherein Y is =O,

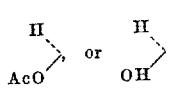

and wherein R' is hydrogen or methyl; to the class represented by Formula IV

IV
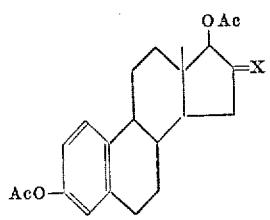

wherein X is

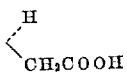

or =CHCOOH; and to the class represented by Formula V

V
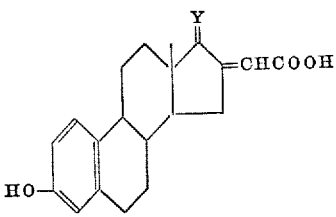

wherein Y is =O or

Some of these intermediates are not only useful for making the lactones of Formula I but are active by themselves as hormonal agents.

In a simple outline, the new compounds are made according to the following scheme: 3-hydroxy-17-oxo-1,3,5(10)-estratriene or its 3-methyl ether is condensed with glyoxylic acid in the presence of sodium hydroxide to the corresponding 3-hydroxy-17-oxo-1,3,5(10)-estratrien-16-ylidenacetic acid or the corresponding 3-methyl ether. The former can be converted into the latter by etherification with dimethyl sulfate or can be reduced with sodium borohydride to 3,17β-dihydroxy-1,3,5(10)-estratrien-16-ylidenacetic acid which in turn can be converted into the corresponding 3-methyl ether. Methyl 3-methoxy-17β-hydroxy-1,3,5(10)-estratrien-16-ylidenacetate is converted to the corresponding 17β-acetate with acetic anhydride in the presence of pyridine, while 3,17β-dihydroxy-1,3,5(10)-estratrien-16-ylidenacetic acid produces the 3,17β-diacetate under similar reaction conditions. These unsaturated acids with a methoxy or an acetoxy group in the 3-position and an acetoxy group in the 17-position can be hydrogenated in the presence of platinum oxide to the corresponding saturated acids, which in turn can be esterified under known conditions. When methyl 3-methoxy-17β-acetoxy-1,3,5(10)-estratrien-16β-ylacetate is first treated with sodium hydroxide and subsequently with hydrochloric acid, the 3-methoxy-17β-hydroxy-1,3,5(10)-estratrien-16β-ylacetic acid lactone is obtained, while the same series of reactions carried out with 3,17β-diacetoxy-1,3,5(10)-estratrien-16β-ylacetic acid produces 3,17β-dihydroxy-1,3,5(10)-estratrien-16β-ylacetic acid lactone. The corresponding δ- or ε-lactones are made by extending the 16β-ylacetic acid chain by the Arndt-Eistert procedure, followed by the transformations outlined above. The lactones with the 3-methoxy group form difficultly-soluble sodium salts when treated with sodium hydroxide under opening of the lactone ring. The 3-methoxy-17β-hydroxy-1,3,5(10)-estratrien-16β-yl acid sodium salts can be used as intermediates for lactones in the 4-estrene series.

The preparation of the new lactones of the invention are better described by reference to the following examples which are meant to be illustrations only and do not constitute the only embodiments of the present invention. In all these examples the reaction temperatures are about 25° C. unless stated otherwise. All melting points up to 300° C. are uncorrected and were determined on a Fisher-Johns melting point apparatus. The melting points of compounds melting above 300° C. were determined in a capillary. The optical rotations were measured in a 10-cm. tube in chloroform or dioxane solutions. The

EXAMPLE 1

*3-Hydroxy-17-Oxo-1,3,5(10)-Estratrien-16-Ylidenacetic Acid*

A solution of 21.62 g. of estrone and 13.55 g. of sodium hydroxide pellets in 220 ml. of water and 200 ml. of methanol is added to the cooled solution of glyoxylic acid, generated from 21.56 g. of methyl 2,2-dimethoxyacetate in 40 ml. of water. The reaction mixture is agitated for 18 hours and then warmed to a gentle reflux for 2 hours. The cooled suspension is acidified with 600 ml. of 2 N hydrochloric acid and diluted with 300 ml. of water. The slurry is extracted with three 300-ml. portions of methylene chloride from which 0.525 g. of starting material is isolated. 3-hydroxy-17-oxo-1,3,5(10)-estratrien-16-ylidenacetic acid which remains in the aqueous suspension is collected on a filter, washed with several small amounts of water, and recrystallized from methanol/water. A first crop of 18.65 g. (72%) of the pure product, melting at 302–4° (decomposition) is isolated. A second crop amounts to 2.886 g., melting at 292–4° C.

A further recrystallization of the first crop from methanol/water gave material having a melting point of 307–8° C. (decomposition), a $[\alpha]_D^{24}$ of +80° (dioxane), analyzing 73.64% C and 6.91% H, corresponding with the calculated values for $C_{20}H_{22}O_4$.

EXAMPLE 2

*3-Methoxy-17-Oxy-1,3,5(10)-Estratrien-16-Ylidenacetic Acid*

(a) A solution of 0.625 g. of 3-hydroxy-17-oxo-1,3,5(10)-estratrien-16-ylidenacetic acid and 0.486 g. of sodium hydroxide pellets in 5.5 ml. of water and 5.5 ml. of methanol is treated with 1.1 ml. of dimethyl sulfate and 5.5 ml. of methanol according to the procedure described by Schindler in Helv. Chim. Acta, 43, 754 (1960). The reaction mixture is transferred to a separatory funnel, diluted with 200 ml. of 0.05 N sodium hydroxide solution, and extracted with methylene chloride. The methylene chloride extract is washed with 0.1 N sodium hydroxide solution and water, dried, and evaporated to leave 0.237 g. of a neutral material.

The alkaline solution is acidified and extracted with methylene chloride. The organic phase is washed with water, dried over anhydrous magnesium sulfate, filtered, and evaporated to leave 0.467 g. of a residue, which is recrystallized from methanol/water to yield 0.366 g. of 3-methoxy-17-oxo-1,3,5(10)-estratrien-16-ylidenacetic acid melting at 245–7° C. (decomposition). After further recrystallizations, a sample with a constant melting point of 250–1° C. (decomposition) is obtained. The new compound has a $[\alpha]_D^{25}$ of +82 (dioxane) and analyzes 74.17% C and 7.41% H, corresponding with the calculated values for $C_{21}H_{24}O_4$.

(b) To a cold solution of glyoxylic acid prepared from 2.2 g. of d-tartaric acid and 3.16 g. of trisodium periodate (para) in 20 ml. of water and 0.3 ml. of concentrated sulfuric acid is added 4.2 g. of 3-methoxy-17-oxo-1,3,5(10)-estratriene 2.22 g. of sodium hydroxide pellets, 40 ml. of water, and 37 ml. of methanol. The reaction mixture is worked up as described in Example 1, diluted with 250 ml. of water, and extracted with methylene chloride. The organic phase is washed in turn with 0.2 N sodium hydroxide solution and water, dried, evaporated and recrystallized from acetone to recover 3.123 g. of 3-methoxy-17-oxy-1,3,5(10)-estratriene. The alkaline washes are acidified with 5 N sulfuric acid and extracted with methylene chloride. The organic solution is washed with water, dried, and evaporated to leave a residue of 0.920 g. of crude 3-methoxy-17-oxo-1,3,5(10)-estratrien-16-ylidenacetic acid. Upon recrystallization from methanol it melts at 250–1° C. (decomposition), has a $[\alpha]_D^{25}$ of +82° (dioxane). A mixture of this with the acid made above under (a) shows no depression in melting point.

EXAMPLE 3

*Methyl 3-Methoxy-17-Oxo-1,3,5(10)-Estratriene-16-Ylidenacetate*

Upon recrystallization of the 0.237 g. of neutral material from Example 2(a) from a fairly concentrated methanol solution, plates with a melting point of 130–1° are obtained. When the compound is allowed to crystallize from a less concentrated methanol solution, fine needles melting at 149–50° C. are obtained. The dimorphic crystals of the above methyl ester give superimposable infrared spectra in chloroform solution and analyze correctly for methyl 3-methoxy-17-oxo-1,3,5(10)-estratrien-16β-ylacetate. The higher melting sample has a $[\alpha]_D^{24}$ of +78° (chloroform).

(b) A solution of 0.38 g. of 3-methoxy-17-oxo-1,3,5(10)-estratrien-16-ylidenacetic acid in 4.0 ml. of methanol and 0.1 ml. of concentrated hydrochloric acid is esterified in the presence of 2,2-dimethoxypropane. The reaction mixture is evaporated under reduced pressure and the residue is dissolved in methylene chloride. The organic solution is washed in turn with dilute alkali and water, dried, evaporated, and the crude residue is recrystallized from a dilute methanol solution to yield 0.233 g. of methyl 3-methoxy-17-oxo-1,3,5(10)-estratrien-16-ylidenacetate, melting at 149–150° C., $[\alpha]_D^{25}$ +78° (chloroform), analyzing 74.28% C and 7.64% H, which corresponds with the calculated values for $C_{22}H_{26}O_4$.

The products of both procedures above are found to be identical.

EXAMPLE 4

*3,17β-Dihydroxy-1,3,5(10)-Estratrien-16-Ylidenacetic Acid*

A solution of 7.2 g. of sodium borohydride in 25 ml. of water is added from a dropping funnel to an ice-cooled solution of 15.60 g. of 3-hydroxy-17-oxo-1,3,5(10)-estratrien-16-ylidenacetic acid in 1400 ml. of methanol, and the funnel is rinsed once with 10 ml. of water. The mixture is first kept in a cooling bath for 30 minutes, is then allowed to warm to room temperature with occasional shaking of the vessel, and finally refluxed for 30 minutes. After cooling, 240 ml. of a 25% sodium hydroxide solution is added and most of the methanol is evaporated under reduced pressure. The resulting slurry is acidified with dilute hydrochloric acid and the residue is filtered and washed with water. The dried, crude product is recrystallized from acetone to yield a first crop of 6.146 g. of 3,17β-dihydroxy-1,3,5(10)-estratrien-16-ylidenacetic acid melting at 320–1° C. (decomposition). The mother liquor produces, upon concentrating, an additional 8.103 g. of this compound, thus giving a total yield of 91%. Further purification by recrystallization gives crystals which have a decomposition point of 321–3° C., a $[\alpha]_D^{25}$ of −1° (dioxane), and analyze 72.88% C and 7.35% H, corresponding with the calculated values of $C_{20}H_{24}O_4$.

EXAMPLE 5

*17β-Hydroxy-3-Methoxy-1,3,5(10)-Estratrien-16-Ylidenacetic Acid*

(a) To a solution of 14.249 g. of the acid obtained in the preceding example and 12.15 g. of sodium hydroxide pellets in 125 ml. of methanol and 125 ml. of water, a solution of 25 ml. of dimethyl sulfate in 45 ml. of methanol is added dropwise. The reaction temperature is kept at 45–50° C. during the addition period. After the dropping funnel is rinsed once with 75 ml. of methanol, the reaction mixture is stirred at 50–55° C. for three hours, at room temperature for two hours, and then allowed to stand overnight. To this solution is added 2.13 g. of sodium hydroxide pellets and the mixture is refluxed for two hours. The resulting solution is diluted to 2000 ml. with water and acidified with 300 ml. of 5 N sulfuric acid. The acidic suspension is warmed on the steam bath for 15 minutes, allowed to cool, and filtered. The solid is washed with several small amounts of water and recrystallized from methanol/water to yield 12.85 g. (86% of theory) of 17β-hydroxy-3-methoxy-1,3,5(10)-estratrien-16-ylidenacetic acid, melting at 230–1° C. Further recrystallizations produce a sample with a constant melting point of 235–6° C., $[\alpha]_D^{25}=0°$, analyzing 73.72% C and 7.77% H, corresponding with the calculated values for $C_{21}H_{26}O_4$.

(b) An identical product is obtained by reducing 3-methoxy-17-oxo-1,3,5(10)-estratrien-16-ylidenacetic acid by the sodium borohydride method described in Example 4, and recrystallizing the product first from methanol/water and subsequently from acetone/petroleum ether (boiling point 90–95° C.).

EXAMPLE 6

*Methyl 17β-Hydroxy-3-Methoxy-1,3,5(10)-Estratrien-16-Ylidenacetate*

A solution of 1.75 g. of the product described in the preceding example in 140 ml. of methanol and 3.5 ml. of concentrated hydrochloric acid is esterified in the presence of 2,2-dimethoxypropane according to Example 3(b). The product is recrystallized from methanol to yield 10.182 g. (83%) of methyl 17β-hydroxy-3-methoxy-1,3,5(10)-estratrien-16-ylidenacetate, melting at 173–4° C. A further 0.934 g. of less pure material, melting at 161–4° C., is obtained from the mother liquors. An analytical sample shows a melting point of 177–8° C. and a $[\alpha]_D^{24}$ of −4° (chloroform), analyzing 74.13% C and 8.21% H, corresponding with the calculated values for $C_{22}H_{28}O_4$.

EXAMPLE 7

*Methyl 17β-Acetoxy-3-Methoxy-1,3,5(10)-Estratrien-16-Ylidenacetate*

A solution of 9.76 g. of the hydroxy ester of Example 6 in 70 ml. of pyridine and 35 ml. of acetic anhydride is allowed to stand at room temperature overnight, and is worked up in known manner. Crystallization from methanol gives a first crop of 9.855 g. (90%) of methyl 17β-acetoxy-3-methoxy-1,3,5(10) - estratrien - 16 - ylidenacetate melting at 139–40° C. Upon concentrating the mother liquor, a second crop of 0.571 g. of material melting at 129–30° C. is isolated. A pure sample melts at 139–40° C., has a $[\alpha]_D^{25}$ of −9° (chloroform), and analyzes 72.13% C and 7.60% H, corresponding with the calculated values of $C_{24}H_{30}O_5$.

EXAMPLE 8

*3,17β-Diacetoxy-1,3,5(10)-Estratrien-16-Ylidenacetic Acid*

A solution of 5.60 g. of the compound made in Example 5 in 40 ml. of pyridine and 20 ml. of acetic anhydride is allowed to stand at room temperature overnight. The mixture is cooled in an ice bath, diluted carefully with 20 ml. of water, and allowed to stand for 10 minutes. The solution is then diluted with 250 ml. of ice-cold 2 N hydrochloric acid. The precipitate is collected on a filter and washed with several small portions of water. The product is recrystallized from methanol/water to give a first crop of 4.846 g. of 3,17β-diacetoxy-1,3,5(10)-estratrien-16-ylidenacetic acid, melting at 199–201° C. A second crop of 1.380 g. melting at 195–6° C. is obtained. The total yield is 88%. A sample, after recrystallization from acetone/petroleum ether, analyzes 70.05% C and 6.95% H, corresponding with the calculated values for $C_{24}H_{28}O_6$.

EXAMPLE 9

*3,17β-Diacetoxy-1,3,5(10)-Estratrien-16β-Ylacetic Acid*

A solution of 2.062 g. of the compound obtained in the preceding example in 100 ml. of methanol and 5 ml. of water is hydrogenated in the presence of 0.04 g. of platinum oxide. The catalyst is separated by filtration. The resulting clear solution is concentrated to give, after cooling, 1.885 g. (91% of theory) of 3,17β-diacetoxy-1,3,5(10)-estratrien-16β-ylacetic acid, melting at 217–19° C. An analytical sample melts at 218–19° C., has a $[\alpha]_D^{24}$ of +40° (chloroform) and analyzes 69.57% C and 7.09% H, corresponding with the calculated values for $C_{24}H_{30}O_6$.

EXAMPLE 10

*3,17β-Dihydroxy-1,3,5(10)-Estratrien-16β-Ylacetic Acid Lactone*

A solution of 1.63 g. of the compound of Example 9 in 75 ml. of methanol and 7.5 ml. of water is treated with 2.0 g. of potassium hydroxide pellets. The reaction mixture is diluted with water, evaporated under reduced pressure to remove methanol, and acidified with hydrochloric acid. The precipitate is collected on a filter, dried and recrystallized from acetone to give 1.046 g. (85%) of 3,17β-dihydroxy-1,3,5(10)-estratrien-16β-ylacetic acid lactone, melting at 306–8° C. (decomposition). A recrystallized sample melts at 310–11° C. with decomposition, has a $[\alpha]_D^{24}$ of +97° (dioxane) and analyzes 76.96% C and 7.79% H, corresponding with the calculated values for $C_{20}H_{24}O_3$.

EXAMPLE 11

*Methyl 17β-Acetoxy-3-Methoxy-1,3,5(10)-Estratrien-16β-Ylacetate*

A solution of 3.99 g. of the compound of Example 7 in 190 ml. of methanol and 10 ml. of water is hydrogenated in the presence of 0.1 g. of platinum oxide. The catalyst is separated by filtration and the solvent is evaporated. The crystalline residue of 3.94 g. is recrystallized from methanol to yield 3.232 g. (81%) of methyl 17β-acetoxy-3-methoxy-1,3,5(10) - estratrien - 16β - ylacetate, melting at 103–4° C. A second crop of 0.278 g. of crystalline material melting at 96–7° C. is obtained from the mother liquor. The analytical sample melts at 104–5° C., has a $[\alpha]_D^{25}$ of +41° (chloroform) and analyzes 71.90% C and 7.80% H, corresponding wih the calculated values for $C_{24}H_{32}O_5$.

EXAMPLE 12

*17β-Hydroxy-3-Methoxy-1,3,5(10)-Estratrien-16β-Ylacetic Acid Lactone*

A solution of 6.18 g. of the compound of Example 11 is hydrolyzed and lactonized as in Example 10 and the reaction product is recrystallized from acetone to give 4.024 g. (80%) of 17β-hydroxy-3-methoxy-1,3,5(10)-estratrien-16β-ylacetic acid lactone melting at 216–18° C. and a second crop of 0.422 g. of the same, melting at 207–10° C. from the mother liquor. An analytical sample has a melting point of 220–1° C., a $[\alpha]_D^{24}$ of +86° (chloroform) and analyzes 76.99% C and 8.12% H, corresponding to the calculated values for $C_{21}H_{26}O_3$.

By treating this lactone (first crop) with 31 ml. of a 2 N aqueous sodium hydroxide solution in 240 ml. of methanol under reflux for 30 minutes, diluting the mixture with 250 ml. of water, concentrating it under reduced pressure to 200 ml., cooling the resulting suspension, collecting the resulting compound on a filter, washing it with water, and drying, 4.326 g. (96%) of sodium 17β-hydroxy-3-methoxy-1,3,5(10)-estratrien-16β-ylacetate, melting at 242–6° (decomposition), is obtained.

EXAMPLE 13

*3 - [3,17β - Dihydroxy - 1,3,5(10) - Estratrien - 16β-Yl] Propionic Acid Lactone, and 4-[3,17β-Dihydroxy-1,3,5(10)-Estratrien-16β-Yl]Butyric Acid Lactone*

(a) The reaction product of Example 9 is converted by the Arndt-Eistert procedure (Fieser and Fieser, "Organic Chemistry," 1956, page 184) into 3-[3,17β-diacetoxy-1,3,5(10)-estratrien-16β-yl]propionic acid. The new diacetoxy acid is hydrolyzed and lactonized to the corresponding δ-lactone as described in Example 10.

(b) In the same manner, the 3-[3,17β-diacetoxy-1,3,5(10)-estratrien-16β-yl]propionic acid described above is converted to the 4-[3,17β-diacetoxy-1,3,5(10)-estratrien-16β-yl]butyric acid as described in the above paragraph. The diacetoxy acid is again hydrolyzed and lactonized by the procedure described in Example 10 to yield the ε-lactone of 4-[3,17β-dihydroxy-1,3,5(10)-estratrien-16β-yl]butyric acid.

EXAMPLE 14

17β-Acetoxy-3-Hydroxy-1,3,5(10)-Estratrien-16β-Ylacetic Acid

The compound described in Example 9 is allowed to be partially hydrolyzed in methanol/water solution in the presence of potassium bicarbonate. The desired compound 17β-acetoxy-3-hydroxy-1,3,5(10)-estratrien-16β-ylacetic acid is isolated after acidification of the reaction mixture.

EXAMPLES 15–32

These examples, all listed in Table 1, are carried out according to procedures given in detail above. The processes used to get to those materials are listed in the column headed by "Process"; the starting materials are referred to in the column headed by "Material." All new compounds are listed with full names with the exception of the term "Q" which refers to "1,3,5(10)-estratrien-16β."

TABLE I

| Ex. | Compound | Process | Material |
|---|---|---|---|
| 15 | Methyl 3, 17β-dihydroxy-Q-ylacetate | 6 | 10 |
| 16 | Methyl 17β-acetoxy-3-hydroxy-Q-ylacetate | 7+14 | 15 |
| 17 | 17β-acetoxy-3-methoxy-Q-ylacetic acid | 8 | 12 |
| 18 | Methyl 17β-hydroxy-3-methoxy-Q-ylacetate | 6 | 12 |
| 19 | 3-[17β-acetoxy-3-hydroxy-Q-yl] propionic acid | 14 | ¹13a |
| 20 | Methyl 3-[3, 17β-dihydroxy-Q-yl] propionate | 6 | 13a |
| 21 | Methyl 3-[17β-acetoxy-3-hydroxy-Q-yl] propionate | 7+14 | 20 |
| 22 | 3-[17β-hydroxy-3-methoxy-Q-yl] propionic acid | 5 | 13a |
| 23 | 3-[17β-acetoxy-3-methoxy-Q-yl] propionic acid | 8 | 22 |
| 24 | Methyl 3-[17β-hydroxy-3-methoxy-Q-yl] propionate | 6 | 22 |
| 25 | Methyl 3-[17β-acetoxy-3-methoxy-Q-yl] propionate | 7 | 24 |
| 26 | 4-[17β-acetoxy-3-hydroxy-Q-yl] butyric acid | 14 | ¹13b |
| 27 | Methyl 4-[3, 17β-diphydroxy-Q-yl] butyrate | 6 | 13b |
| 28 | Methyl 4-[17β-acetoxy-3-hydroxy-Q-yl] butyrate | 7+14 | 27 |
| 29 | 4-[17β-hydroxy-3-methoxy-Q-yl] butyric acid | 5 | 13b |
| 30 | 4-[17β-acetoxy-3-methoxy-Q-yl] butyric acid | 8 | 29 |
| 31 | Methyl 4-[17β-hydroxy-3-methoxy-Q-yl] butyrate | 6 | 29 |
| 32 | Methyl 4-[17β-acetoxy-3-methoxy-Q-yl] butyrate | 7 | 31 |

¹ Refers to intermediate in example indicated.

Since the lactones of this invention are in equilibrium with hydroxyacids represented by Formula II, it will be obvious to those skilled in the art that the corresponding alkali salts of these acids can easily be obtained. Thus, for convenience, the lactones may be used in the form of their alkali or earth alkali salts, e.g. sodium 3,17β-dihydroxy-1,3,5(10)-estratrien-16β-ylacetate, potassium 3-[17β-hydroxy-3-oxo-1,3,5(10)-estratrien-16β-yl]propionate, calcium 3,17β-dihydroxy-1,3,5(10)-estratrien-16β-ylacetate, etc. These salts may be made by reacting the lactones with stoichiometric amounts of the desired base.

In all the above examples, the assigned structures are found to agree with the ultra-violet and infrared spectra.

The steroid lactones of the present invention are all useful for hormonal activities in warm-blooded animals. Among these hormonal activities are anti-androgenic, estrogenic, and anabolic activities.

Among the compounds included in the above Formulae III, IV and V, those wherein the 16-substituent is an unsaturated acid radical or the corresponding methyl ester radical are important intermediates for the manufacture of the new, physiologically active lactones of Formula I.

Others may practice the invention in any of the numerous ways which will be suggested to one skilled in the art by the present disclosure. All such practice of the invention is considered to be a part hereof, provided it falls within the scope of the appended claims.

We claim:

1. A steroid of the formula

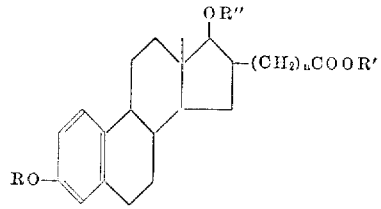

wherein R and R' are each selected from the group consisting of hydrogen and methyl, wherein R" is selected from the group consisting of hydrogen and acetyl, and $n$ is an integer from 1 to 3 inclusive.

2. Steroid lactones of the formula

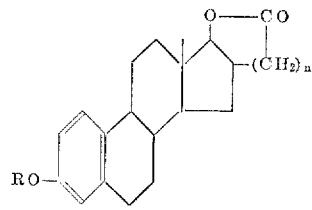

wherein R is selected from the group consisting of hydrogen and methyl, and wherein $n$ is an integer from 1 to 3 inclusive.

3. 3,17β-dihydroxy-1,3,5(10)-estratrien-16β-ylacetic acid lactone.

4. 17β-hydroxy-3-methoxy-1,3,5(10)-estratrien-16β-ylacetic acid lactone.

5. A steroid of the formula

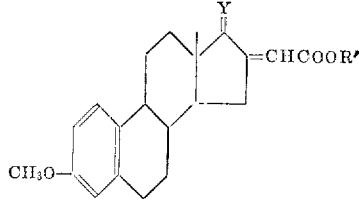

wherein Y is selected from the group consisting of =O,

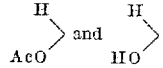

and R' is selected from the group consisting of hydrogen and methyl.

6. A steroid of the formula

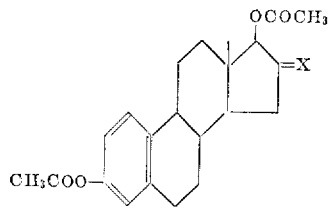

wherein X is selected from the group consisting of

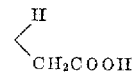

and =CHCOOH.

7. A steroid of the formula

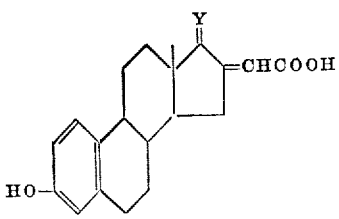

wherein Y is selected from the group consisting of =O and

8. Methyl 17β-acetoxy-3-methoxy-1,3,5(10)-estratrien-16β-ylacetate.
9. The process of making a steroid of the formula

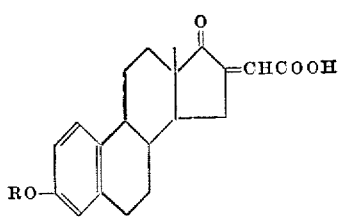

wherein R is selected from the group consisting of hydrogen and methyl, comprising the step of condensing the corresponding steroid of the formula

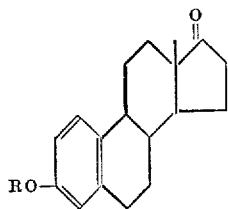

with glyoxylic acid in an alkaline medium.
10. The process of making a steroid of the formula

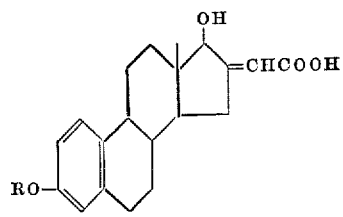

wherein R is selected from the group consisting of hydrogen and methyl, comprising the step of reducing the corresponding steroid of the formula

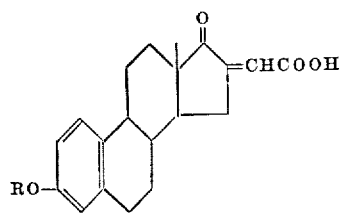

with sodium borohydride.

11. The process of making a steroid of the formula

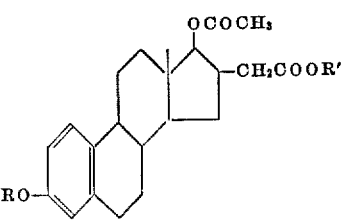

wherein R is selected from the group consisting of methyl and acetyl, and R' is selected from the group consisting of hydrogen and methyl, comprising the step of hydrogenating the corresponding steroid of the formula

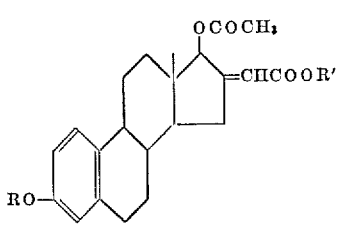

in the presence of platinum oxide.
12. The process of making a steroid lactone of the formula

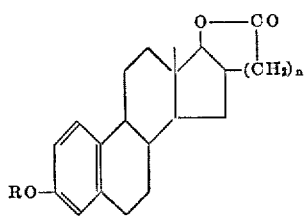

wherein R is selected from the group consisting of hydrogen and methyl, and $n$ is an integer from 1 to 3 inclusive, comprising the steps of refluxing a steroid of the formula

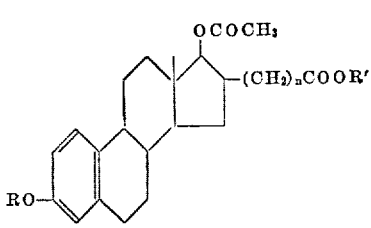

wherein R is selected from the group consisting of methyl and acetyl and wherein R' is selected from the group consisting of hydrogen and methyl, in an alkaline medium and subsequent acidification with a mineral acid.

References Cited in the file of this patent

Adams et al.: Organic Reactions, vol. 1, 1942, pages 38–62.
Danieli et al.: Chem. and Ind. (1958), pages 1724–1726.

UNITED STATES PATENT OFFICE
CERTIFICATE OF CORRECTION

Patent No. 3,089,874                            May 14, 1963

Paul Kurath et al.

It is hereby certified that error appears in the above numbered patent requiring correction and that the said Letters Patent should read as corrected below.

Column 1, lines 59 to 61, the formula should appear as shown below instead of as in the patent:

column 3, line 28, for "$C^{20}H^{22}O^4$" read -- $C_{20}H_{22}O_4$ --; line 31, for "-Oxy-", in italics, read -- -Oxo- --, in italics; line 62, after "-estratriene" insert a comma; same column 3, line 69, for "-17-oxy-" read -- -17-oxo- --; column 4, line 4, for "-Estratriene-", in italics, read -- -Estratrien- --, in italics; column 5, line 22, for "1.75 g." read -- 11.75 g. --; column 7, TABLE I, second column, line 2 thereof, for "-hyrdoxy-" read -- -hydroxy- --; same TABLE I, second column, line 23 thereof, for "-diphydroxy-" read -- -dihydroxy- --.

Signed and sealed this 10th day of December 1963.

(SEAL)
Attest:

ERNEST W. SWIDER
Attesting Officer

EDWIN L. REYNOLDS
Acting Commissioner of Patents